Patented Apr. 20, 1954

2,676,124

UNITED STATES PATENT OFFICE 2,676,124

PROCESS FOR MAKING CAPACITOR

Levin W. Foster, Pittsfield, Mass., assignor, by mesne assignments, to the United States of America as represented by the Secretary of the Navy No Drawing. Application June 28, 1950, Serial No. 170,961

1 Claim. (Cl. 154—80)

The present invention relates generally to capacitors and more particularly to dry-type capacitors and a process for making the same.

One type of capacitor in common use at the present time is formed by providing two strips of electrically conducting foil to form the capacitor plates, interposing suitable dielectric sheets such as paper or the like between said foil strips, and winding said strips and interposed sheets into a roll of any suitable shape, as for example of circular or oval cross section, or pressed into a rectangular cross section. It has been found that the characteristics of such capacitors can be greatly improved by impregnating the dielectric sheets with a suitable material having high dielectric properties. The present invention is concerned primarily with a method for so impregnating such sheets as a part of the process of making such capacitors, and a suitable dielectric impregnant for effecting the desired results of the present process.

It is, therefore, one object of the present invention, to provide a process for manufacturing such capacitors as afore-described, wherein the dielectric sheets are impregnated with a dielectric impregnant.

Another object of the present invention is to provide a process for making such capacitors as aforedescribed, wherein the dielectric sheets are impregnated with a dielectric impregnant after the sheets and foil strips have been assembled and formed into the desired shape.

Another object of the present invention is to provide a process for making such capacitors as aforedescribed, wherein an impregnable dielectric base material is impregnated with a dielectric impregnant carried by a fluid vehicle after the capacitor is assembled and formed into the desired shape, and thereafter the vehicle is removed from the capacitor.

Another object of the present invention is to provide a process for making such capacitors as aforedescribed, wherein the dielectric sheets are impregnated with a dielectric plastic resin carried by a volatile solvent after the sheets and foil strips are assembled and formed into the desired shape, and thereafter the solvent vehicle is evaporated from the capacitor.

Another object of the present invention is to provide a capacitor of the type afore-described, whose dielectric sheets are impregnated with a dielectric resin, as for example polyvinylcarbazole.

In making dry-type capacitors it has been the practice prior to the present invention to make the dielectric material by coating paper sheets or other similar impregnable material with a suitable dielectric resin carried by a volatile solvent and then evaporating the solvent and drying the sheet before forming the capacitor. Two strips of electrically conducting foil are then rolled and formed into a desired shape with the thus prepared dielectric interposed therebetween to provide a compact capacitor. In accordance with the present invention, however, such a capacitor is made by first rolling and forming into the desired shape two electrically conducting foil strips with an impregnable dielectric material, such as paper, interposed therebetween. The thus shaped and formed capacitor is then immersed in a dielectric resin impregnant carried in a suitable volatile solvent until the impregnable dielectric material is saturated to the desired degree by the impregnating solution. Whereupon, the thus impregnated condenser is removed from the impregnating solution and dried to remove the volatile solvent vehicle, providing a dry dielectric between the foil strips comprising an impregnable dielectric impregnated to the desired extent with a dielectric resin.

Considering the above outlined steps of the present process in greater detail, the preformed and preshaped capacitor, comprising two strips of electrically conducting foil and impregnable dielectric sheets interposed therebetween, is first heated to dryness to remove moisture therefrom, and if desired, this drying step may be done under vacuum to insure a more complete and more rapid removal of moisture. After the thus prepared capacitor is cooled, it is preferably placed under vacuum to remove the major portion of air or gas, and while thus degassed the capacitor is immersed in the impregnating solution, as may be effected by holding the capacitor under vacuum until immersed. The impregnation is preferably carried out under vacuum to prevent the entrapment of gas during this step, which would prevent complete impregnation. After the dielectric material is impregnated to the desired degree, the capacitor is dried preferably under vacuum to remove the solvent vehicle, leaving a capacitor having dry dielectric interposed between its plates and formed of an impregnable base material coated or impregnated with a film of dielectric resin. In the herein described process, the drying step may be omitted if a moisture free impregnable base material is employed.

It has been found that such fibrous materials as kraft paper forms a suitable impregnable dielectric base and that a 5% solution of polyvinylcarbozole in trichlorethylene forms a suitable impregnating solution. As is apparent, variations in the strength of the impregnating solution will vary the degree and rate of impregnation and may be accordingly adjusted to provide the desired capacitor characteristics in accordance with the size of the capacitor being produced, although it has been found that greater than 10% polyvinylcarbazole results in a less desirable degree of impregnation. By employing the recommended impregnating solution with a kraft paper dielectric base, excellent impregnation is obtained with little or substantially no air voids being formed in the dielectric, resulting in condensers of low power factor and extremely high insulation resistance. Modifications of the present invention within the spirit and scope thereof as defined by the appended claim will be apparent to those skilled in the art and are within the monopoly of the present patent. For example, other dielectric resins, as are well known in the art, other resin solvents having volatilizing characteristics similar to trichlorethylene, and other impregnable dielectric base materials may be employed in the present process.

What is claimed is:

In the manufacture of dry-type capacitors of the type described, the process of heating and drying a preformed capacitor of electrically conducting plates having an impregnable dielectric interposed therebetween, evacuating a substantial portion of the gases from said capacitor, cooling said capacitor, immersing the capacitor in an impregnating solution while degassed, said impregnating solution comprising a 5% solution of polyvinylcarbozole in trichlorethylene, and drying the thus impregnated capacitor by evaporation of the trichlorethylene therefrom.

References Cited in the file of this patent

UNITED STATES PATENTS

| Number | Name | Date |
|---|---|---|
| 1,594,124 | Shrader | July 27, 1926 |
| 1,729,056 | Texier | Sept. 24, 1929 |
| 1,970,776 | Smith | Aug. 21, 1934 |
| 2,414,320 | Miller et al. | Jan. 14, 1947 |
| 2,442,183 | Stearns | May 25, 1948 |
| 2,492,166 | Marco | Dec. 27, 1949 |
| 2,526,688 | Robinson | Oct. 24, 1950 |